United States Patent
Patel et al.

(10) Patent No.: US 10,853,039 B2
(45) Date of Patent: Dec. 1, 2020

(54) OPTIMIZATION APPLICATION

(71) Applicant: AT&T Intellectual Property I, L.P., Atlanta, GA (US)

(72) Inventors: Ankitkumar Patel, Bridgewater, NJ (US); David Kinsey, Carnation, WA (US); Matti Hiltunen, Morristown, NJ (US); Sarat Puthenpura, Berkeley Heights, NJ (US); Sastry Isukapalli, Green Brook, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/033,794

(22) Filed: Jul. 12, 2018

(65) Prior Publication Data

US 2020/0019381 A1 Jan. 16, 2020

(51) Int. Cl.
| | |
|---|---|
| *G06F 8/10* | (2018.01) |
| *G06F 8/35* | (2018.01) |
| *G06F 8/71* | (2018.01) |
| *G06F 8/77* | (2018.01) |
| *G06F 8/36* | (2018.01) |

(52) U.S. Cl.
CPC ............. *G06F 8/10* (2013.01); *G06F 8/35* (2013.01); *G06F 8/36* (2013.01); *G06F 8/71* (2013.01); *G06F 8/77* (2013.01)

(58) Field of Classification Search
CPC .......... G06F 8/10; G06F 8/35–36; G06F 8/71; G06F 8/77
USPC ........................................................ 717/101
See application file for complete search history.

(56) References Cited

U.S. PATENT DOCUMENTS

| | | | |
|---|---|---|---|
| 7,472,377 B2 * | 12/2008 | Anand | G06F 8/71 717/101 |
| 8,881,146 B2 * | 11/2014 | Padmanabhuni | G06F 9/45558 711/173 |
| 9,503,391 B2 | 11/2016 | Xia et al. | |
| 9,519,469 B2 | 12/2016 | Li | |
| 9,712,634 B2 | 7/2017 | Ang et al. | |
| 9,742,873 B2 | 8/2017 | Ananthanarayanan et al. | |
| 9,760,952 B2 | 9/2017 | Chen et al. | |
| 9,876,684 B2 | 1/2018 | Gomadam et al. | |
| 9,888,040 B2 | 2/2018 | Hoy et al. | |

(Continued)

OTHER PUBLICATIONS

Gent et al., "Minion: A Fast, Scalable, Constraint Solver," Proceedings of the 2006 conference on ECAI 2006, p. 98-102. (Year: 2006).*

G. Perez et al., "On Downloading and Using CPLEX within COIN-OR for Solving Linear/Integer Optimization Problems," Univ. del Pais Vasco, ISSN: 1134-8984, 2011, 36pg. (Year: 2011).*

R. Perez et al., "pyOpt: A Python-Based Object-Oriented Framework for Nonlinear Constrained Optimization," Structural and Multidisciplinary Optimization, vol. 45, Issue 1, Jan. 2012, p. 101-118. (Year: 2012).*

(Continued)

*Primary Examiner* — Ryan D. Coyer
(74) *Attorney, Agent, or Firm* — Guntin & Gust, PLC; Atanua Das (57) ABSTRACT

In one embodiment, a method includes receiving, by one or more interfaces, an optimization application, a request for an optimization, one or more policies required to implement the optimization, and data required to implement the optimization. The method also includes converting, by one or more processors and the optimization application, the one or more policies into optimization constraints and objective functions. The method further includes determining, by one or more processors and the optimization application, a solution to the optimization based on the optimization constraints, the objective functions, and the data.

20 Claims, 7 Drawing Sheets

(56) References Cited

U.S. PATENT DOCUMENTS

| | | | |
|---|---|---|---|
| 9,949,133 B2 | 4/2018 | Ashrafi | |
| 10,055,198 B1* | 8/2018 | Gupta | G06F 8/10 |
| 2002/0055905 A1* | 5/2002 | Jannah | G06Q 40/02 |
| | | | 705/38 |
| 2005/0283353 A1* | 12/2005 | Billingsley | G06Q 10/10 |
| | | | 703/23 |
| 2007/0250860 A1* | 10/2007 | Victorson | H04N 5/44543 |
| | | | 725/45 |
| 2008/0147573 A1* | 6/2008 | Hamadi | G06N 20/00 |
| | | | 706/12 |
| 2008/0183517 A1* | 7/2008 | Hamadi | G06Q 10/06 |
| | | | 705/7.13 |
| 2008/0183538 A1* | 7/2008 | Hamadi | G06Q 10/06 |
| | | | 705/7.14 |
| 2008/0294484 A1* | 11/2008 | Furman | G06Q 10/06316 |
| | | | 705/7.26 |
| 2011/0271259 A1* | 11/2011 | Moench | G06F 11/3628 |
| | | | 717/129 |
| 2013/0080641 A1* | 3/2013 | Lui | H04L 43/045 |
| | | | 709/226 |
| 2014/0025610 A1* | 1/2014 | Fox | G06F 7/60 |
| | | | 706/13 |
| 2017/0061348 A1 | 3/2017 | Mack et al. | |
| 2017/0123863 A1 | 5/2017 | Erickson et al. | |
| 2017/0192957 A1* | 7/2017 | Ide | G06F 17/2785 |
| 2018/0341477 A1* | 11/2018 | Kulkarni | G06F 8/76 |

OTHER PUBLICATIONS

"Google Optimization Tools," Google Optimization Tools Optimization Google Developers, https://developers.google.com/optimization/ downloaded Aug. 29, 2018, pp. 1-3.

"What is OptaPlanner?," OptaPlanner—Constraint satisfaction solver (Java™, Open Source), https://www.optaplanner.org/, downloaded Aug. 29, 2018, pp. 1-3.

"pyOpt" http://www.pyopt.org/, downloaded Aug. 29, 2018, 1 page.

"GLPK (GNU Linear Programming Kit)," GLPK—GNU Project—Free Software Foundation (FSF), https://www.gnu.org/software/glpk/, download Aug. 29, 2018, pp. 1-2.

"AMPL Streamlined Modeling for Real Optimization," Solver—AMPLAMPL, https://ampl.com/products/solvers/, downloaded Aug. 29, 2018, 1 page.

Heorhiadi, V. et al., "Simplifying Software-Defined Network Optimization Using SOL," 13th USENIX Symposium on Networked Systems Design and Implementation (NSDI '16), Mar. 16-18, 2016, pp. 223-237.

Perez, R. E. et al., "pyOpt: A Python-Based Object-Oriented Framework for Nonlinear Constrained Optimization," Structural and Multidisciplinary Optimization, vol. 45, Issue 1, Jan. 2012, pp. 101-118.

Paul, K., "Optimization Framework Project," https://wiki.onap.org/display/DW/Optimization+Framework+Project, Jul. 23, 2018, 4 pages.

* cited by examiner

OPTIMIZATION APPLICATION

TECHNICAL FIELD

This disclosure generally relates to an application, and more specifically to an optimization application.

BACKGROUND

Optimization, which involves generating a solution from a set of alternatives, plays a crucial part in control systems such as Element Management Systems (EMS), business support systems (BSS), and operation support systems (OSS) to maximize desired system outcomes and minimize undesired system outcomes. Solving an optimization problem may involve constraints, optimization goals, and information over which the control system optimizes the parameters of interest.

SUMMARY

According to an embodiment, a method includes receiving, by one or more interfaces, an optimization application, a request for an optimization, one or more policies required to implement the optimization, and data required to implement the optimization. The method also includes converting, by one or more processors and the optimization application, the one or more policies into optimization constraints and objective functions. The method further includes determining, by one or more processors and the optimization application, a solution to the optimization based on the optimization constraints, the objective functions, and the data.

According to another embodiment, one or more computer-readable non-transitory storage media embodies software that is executable to receive an optimization application, receive a request for an optimization, receive one or more policies required to implement the optimization, and receive data required to implement the optimization. The software is further executable to convert, by the optimization application, the one or more policies into optimization constraints and objective functions. The software is further executable to determine, by the optimization application, a solution to the optimization based on the optimization constraints, the objective functions, and the data.

According to yet another embodiment, a system includes one or more processors and a memory coupled to the processors comprising instructions executable by the processors to receive an optimization application, receive a request for an optimization, receive one or more policies required to implement the optimization, and receive data required to implement the optimization. The instructions are further executable to convert, by the optimization application, the one or more policies into optimization constraints and objective functions. The instructions are further executable to determine, by the optimization application, a solution to the optimization based on the optimization constraints, the objective functions, and the data.

Technical advantages of this disclosure may include the following. A technical advantage may include providing an optimization application built from a framework that can be reused and exposed as a service to multiple systems. A technical advantage may include using a disclosed model and policy-driven approach that allows the run-time behavior of an optimization application to be changed with no change in the underlying implementation. A technical advantage may include providing a set of libraries and toolkits that may be used by an application developer to design an optimization application. Using the framework, the developer can focus more on high-level logic and less on low-level implementation details while developing an optimization application, reducing time to market the optimization application.

A technical advantage may include designing and developing model and policy-driven optimization applications. A technical advantage may include capturing the objectives and constraints of an optimizer into an optimization model file using a Domain Specific Language (DSL) defined by the optimization framework. A technical advantage may include capturing the required information and relevant information structure for an optimization model or an interface into a data template using the DSL defined by the framework. A technical advantage may include capturing information related to policy models, an application interface, a solver interface, and an execution flow into an application configuration file using the DSL defined by the framework.

A technical advantage may include auto-generating policy models relevant to constraints and objectives of an optimization model and uploading the models into a policy system such that the constraints and objectives can be configured as policies and enforced by the optimization application during run-time. A technical advantage may include the process of auto-generating interface validation models and validating an application interface using the generated models in a validation library without significant development efforts. A technical advantage may include a configuration-driven approach to capture the execution flow of an optimization application.

A technical advantage may include fetching policies, translating the policies into constraints, and enforcing the constraints during run-time into an optimization solver such that the behavior of an optimization application can be changed over time without significant development effort. A technical advantage may include retrieving data from one or more data inventory systems using a library of configuration-driven data adaptors. A technical advantage may include transforming data into multiple formats and performing unit conversions using a library of data formatters and normalizers. A technical advantage may include generating a data file representing a data model for a genetic solver or an interface for a custom solver using a generic data file generator. A technical advantage may include conducting optimization using a library of generic and custom solvers.

A technical advantage may include providing resiliency, scalability, managing dependencies, building, and packaging an application using a library of toolkits. A technical advantage may include auto-generating a project structure for an application.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DESCRIPTION

Traditional approaches for creating and maintaining optimization applications often result in duplicated efforts and introduce inconsistency, redundancy, software management, and operational overhead. For example, rules are intertwined with data, which leads to custom solutions. Any changes in rules or data breaks the optimization functionality and requires redesigning and redevelopment efforts. As another example, optimization logic is tightly integrated with other system logic and cannot be explored and/or consumed beyond the boundary of the system. If other systems require the same capabilities, the optimization functionality must be replicated. Maintaining consistent logic redundantly across multiple systems results in software maintenance and operational overhead. As still another example, optimization rules are buried within optimization logic such that the same set of rules are enforced to every client. Thus, the optimization service cannot be customized per client. To support the diverse requirements from clients, custom optimizations need to be designed and implemented for each variant of rules. As still another example, because common functionalities across optimization applications are replicated instead of reused when bringing up a new optimization service, redundant development efforts introduce delay to market an optimization application.

In the present disclosure, optimization rules and data are decoupled and modeled, resulting in significant efficiencies in creating new optimization applications. By making the optimization rules and data policy-driven, the behavior of an optimization application can be changed over time with minor implementation effort. This disclosure presents a framework architecture using model and policy-driven optimization applications that can be designed, developed, deployed, and exposed as a service. The optimization application automatically creates optimization using the model and policy-driven approach. The optimization rules may be specified through policies by a client, and the optimization application may automatically translate the policies into optimization models. The optimization models may be interpreted by either generic or custom solvers. The data required for the optimization is automatically retrieved using a database of policy and configuration-driven data adaptors.

To build a standalone optimization application from an optimizer, a set of functionalities may be connected with the optimizer. This set of functionalities may include well-defined interfaces, necessary data collection, normalization, and formatting modules, and tools for dependency management and packaging needs. The disclosed optimization framework may provide abstractions using a set of libraries and toolkits to build an optimization application. The framework offers well-designed, ready-to-use functionalities that are commonly required across optimization applications.

While a wide range of optimization solvers are available to build an optimization application (e.g., Google OR-Tools, OptaPlanner, pyOpt, and math programming solvers like GNU Linear Programming Kit (GLPK) and A Mathematical Programming Language (AMPL)), these optimization solvers do not provide the capabilities to build a standalone optimization application. The standalone optimization application of this disclosure provides one or more of the following capabilities: a policy-driven approach to enable configurability in an optimizer; libraries and toolkits to support scalability and resiliency to an optimization application; libraries and toolkits to support data processing and application state management functionalities; libraries and toolkits to support dependency management, packaging, and deployment functionalities; and interfaces to expose optimization capabilities to other systems.

Figure 1:
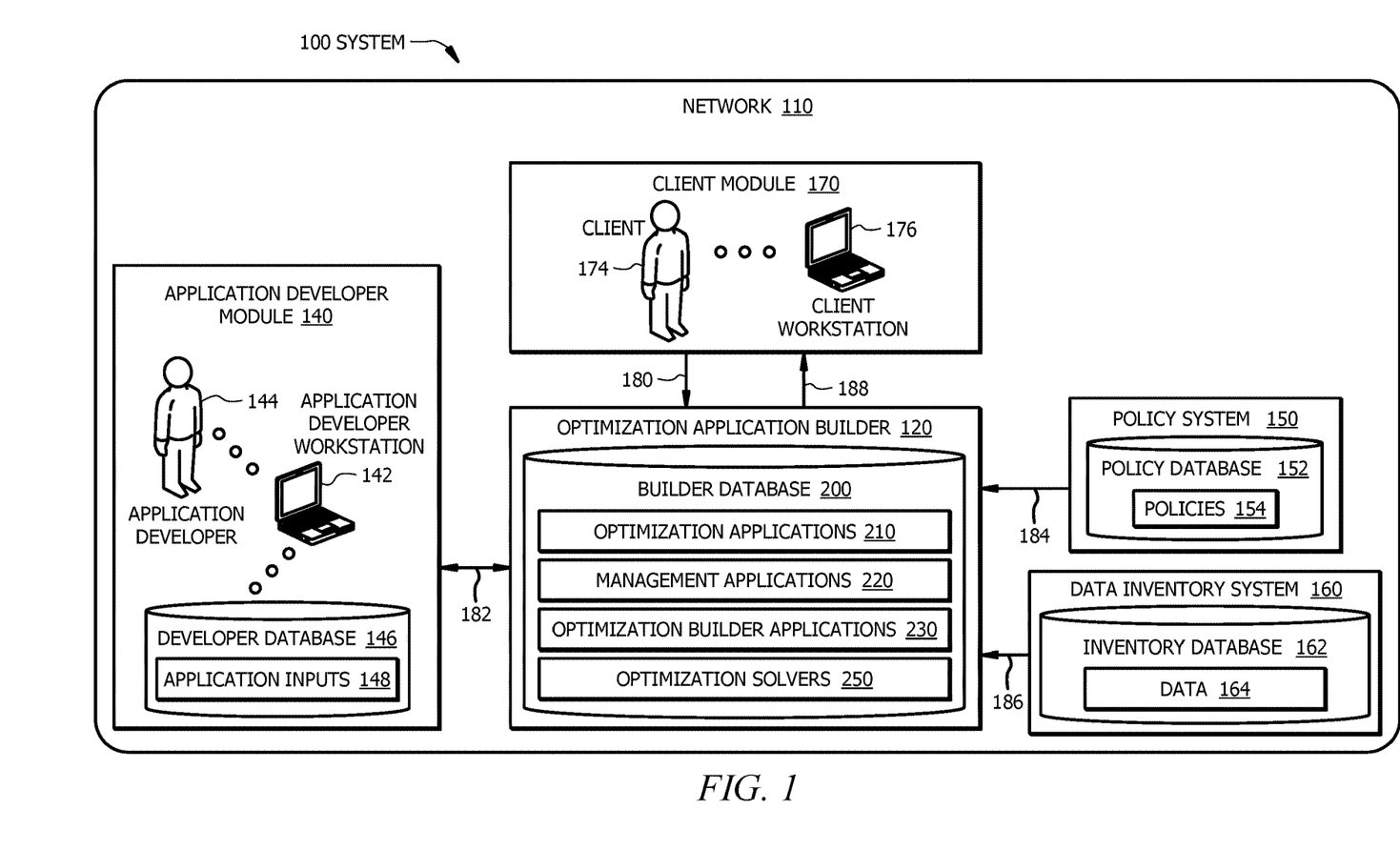
FIG. 1 illustrates an example system for building an optimization application.
Figure 2:
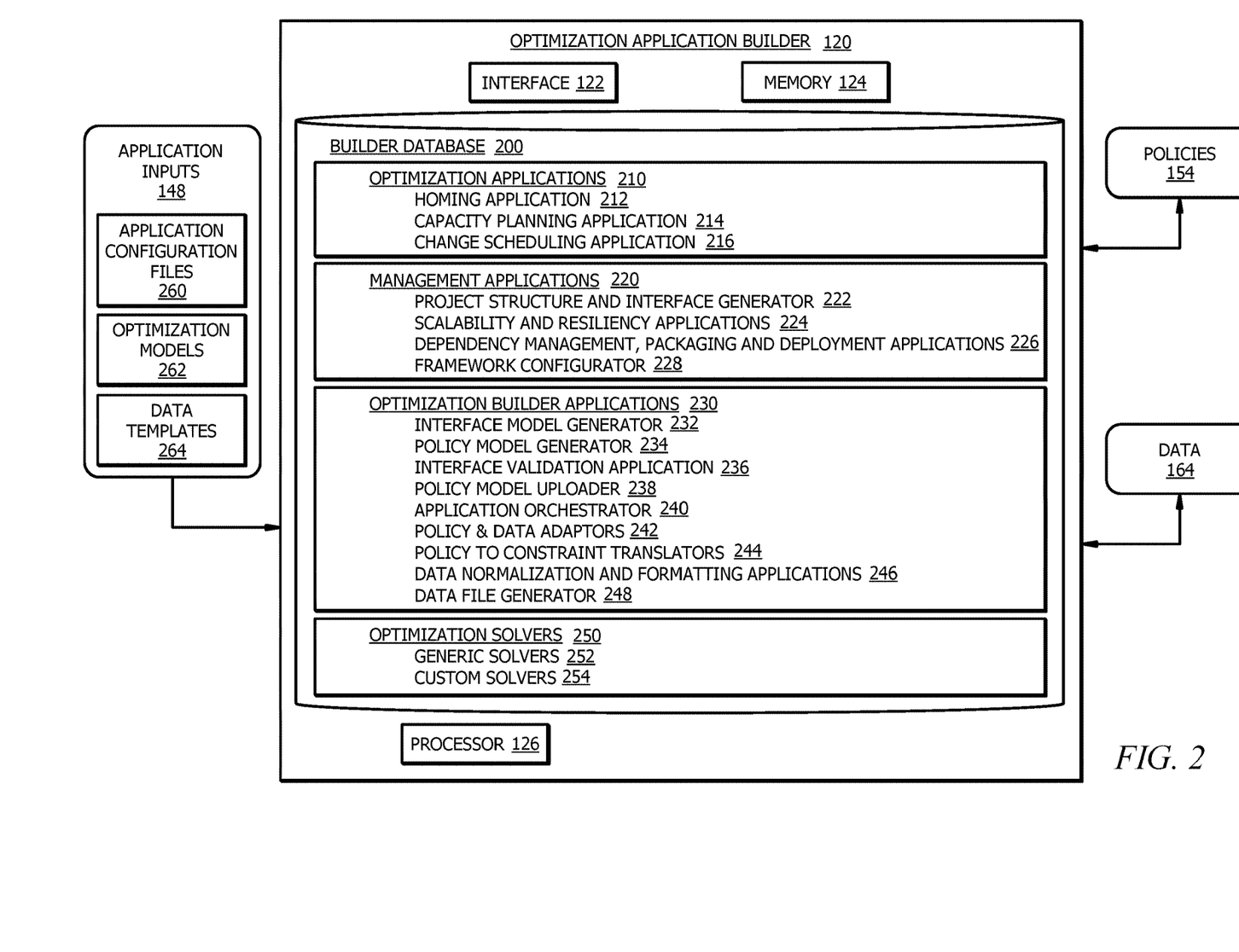
FIG. 2 illustrates an example optimization application builder that may be used by the system of FIG. 1.
Figure 3A:
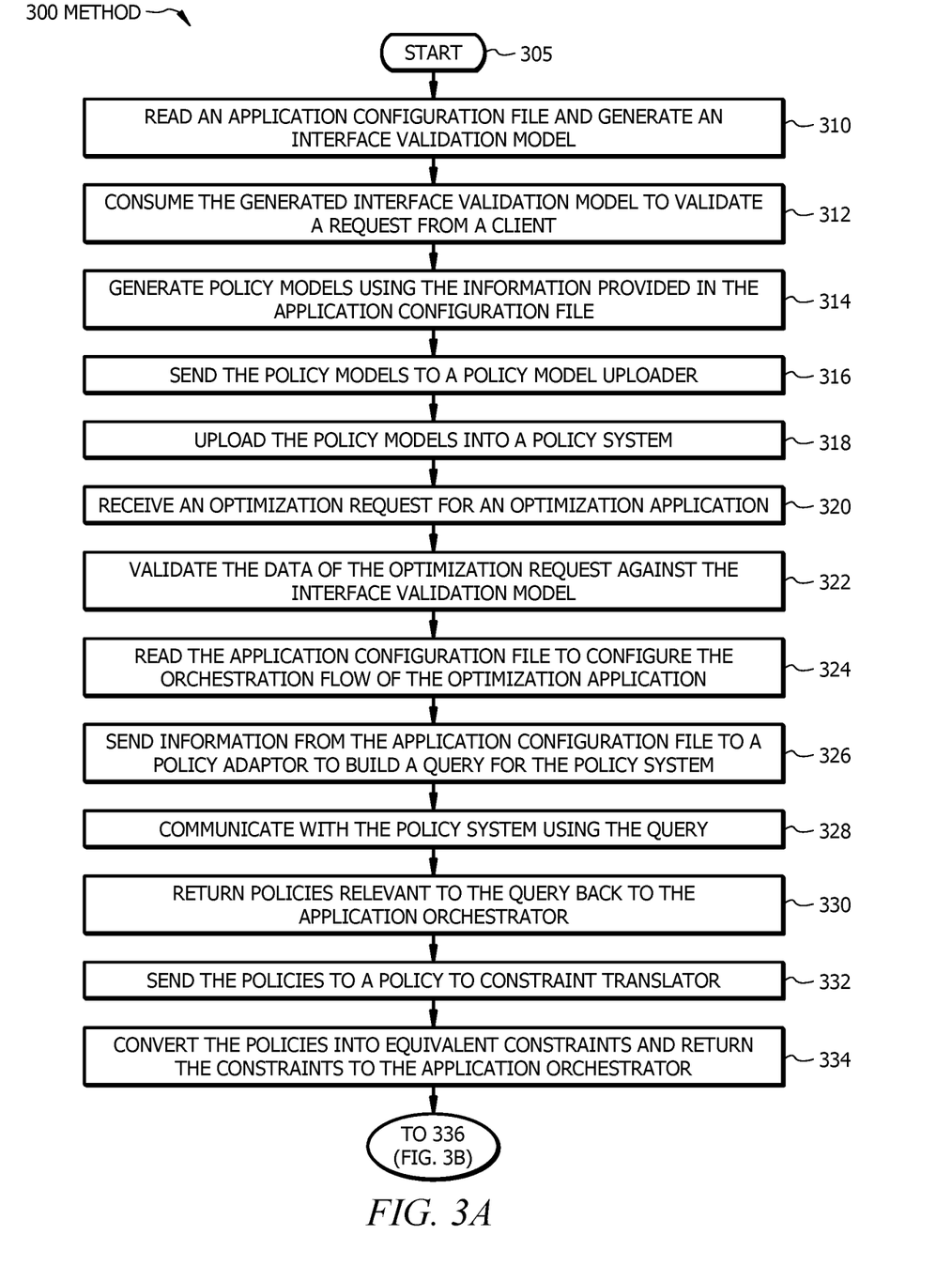
FIGS. 3A, 3B, and 3C illustrate an example method for implementing an optimization application that may be used by the system of FIG. 1.
Figure 3B:
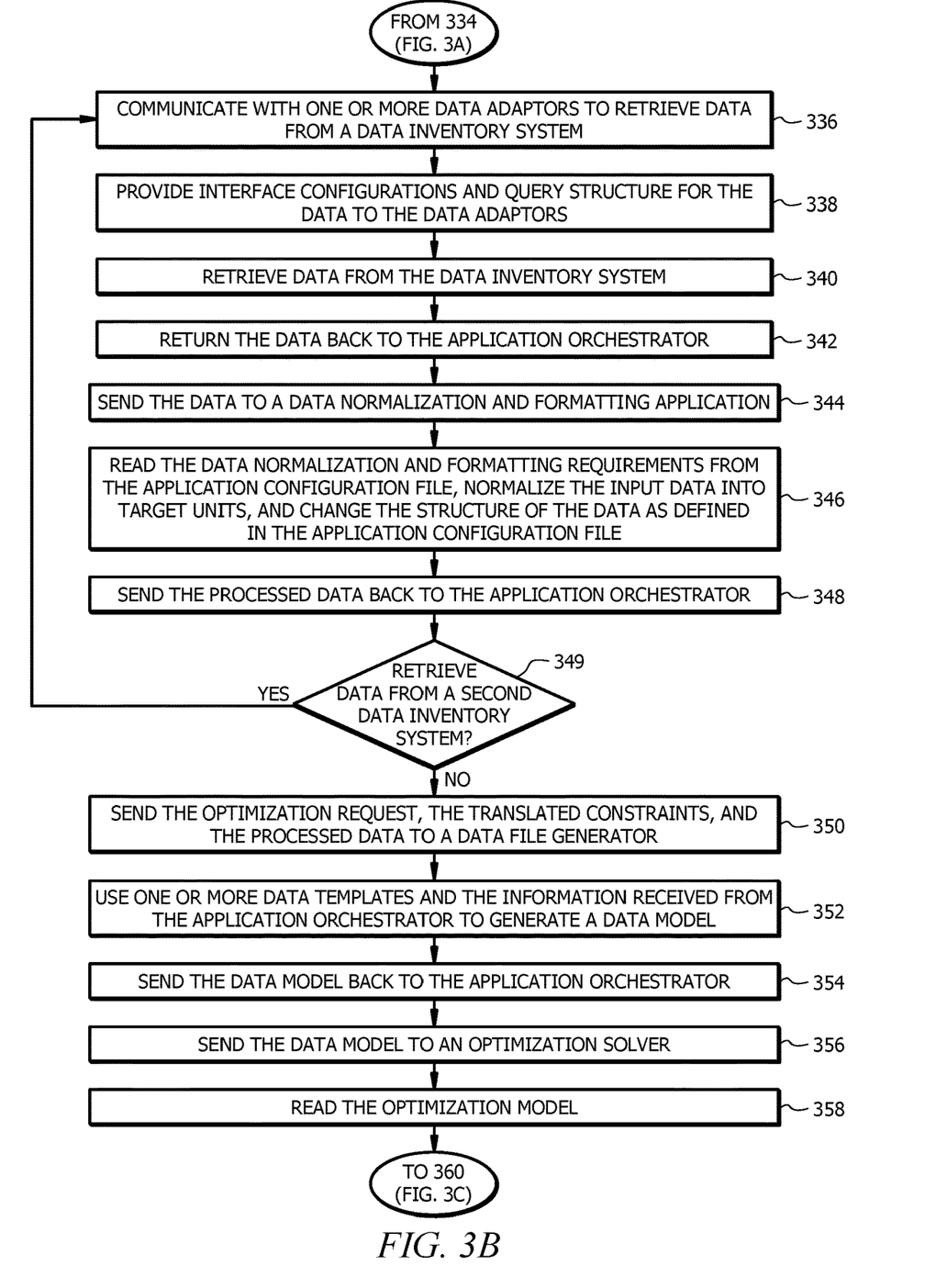
Figure 3C:
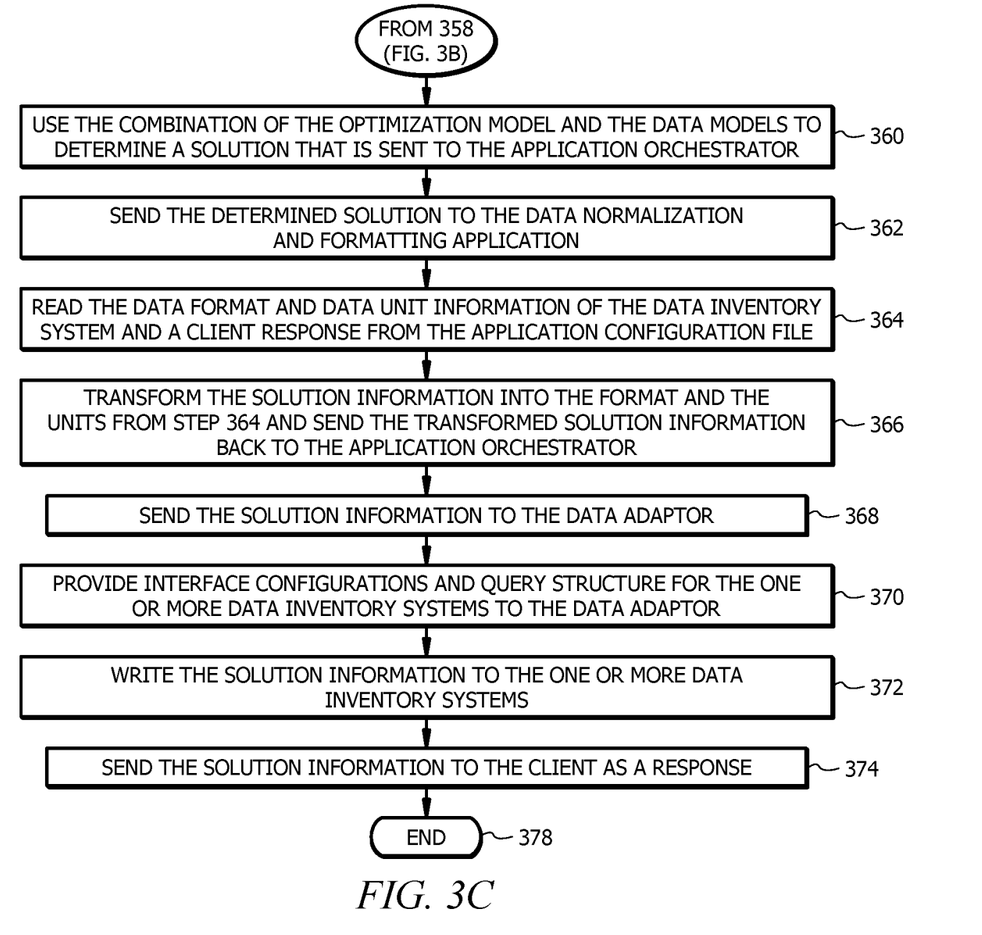
Figure 4:
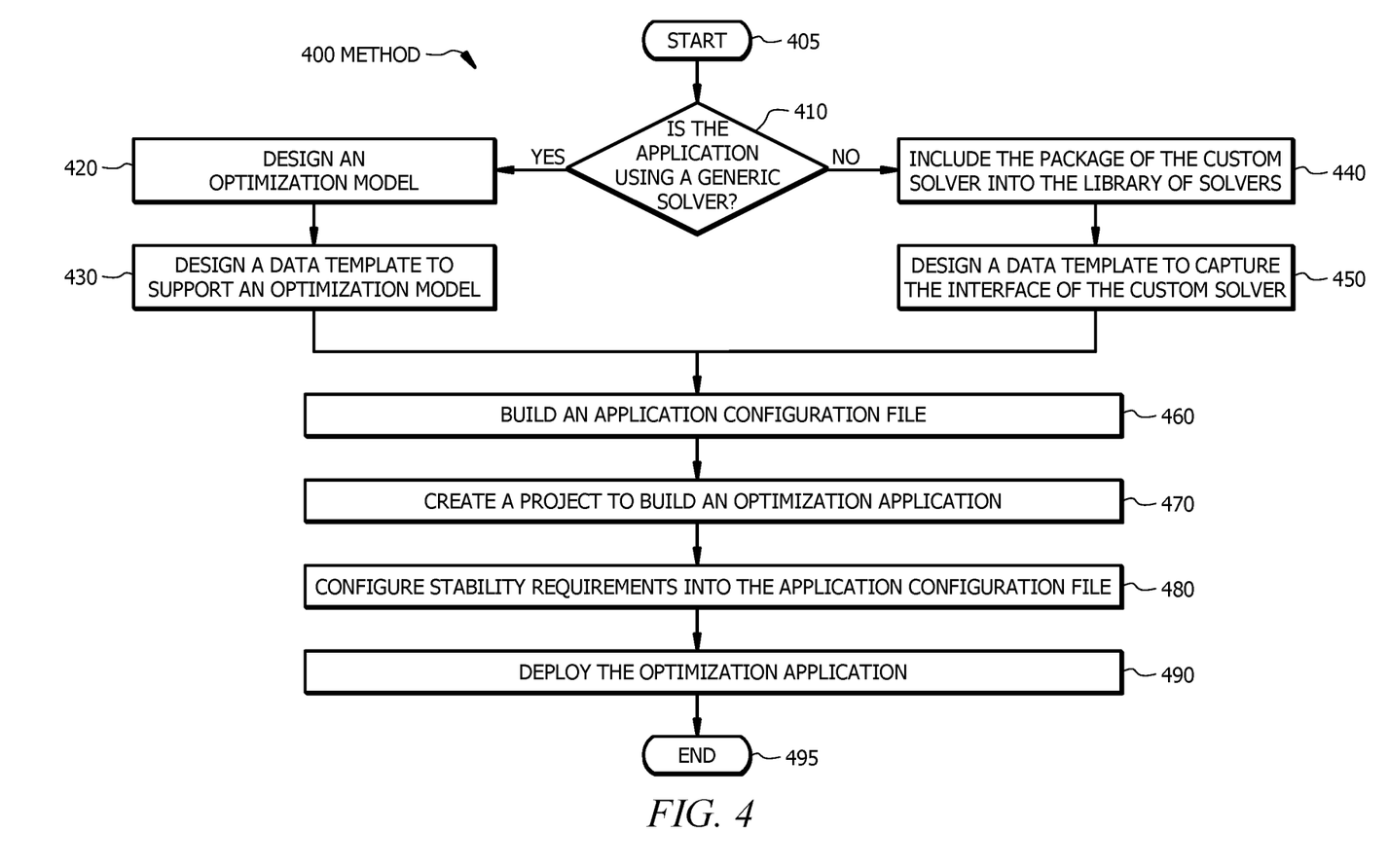
FIG. 4 illustrates an example method for building an optimization application that may be used by the system of FIG. 1.
Figure 5:
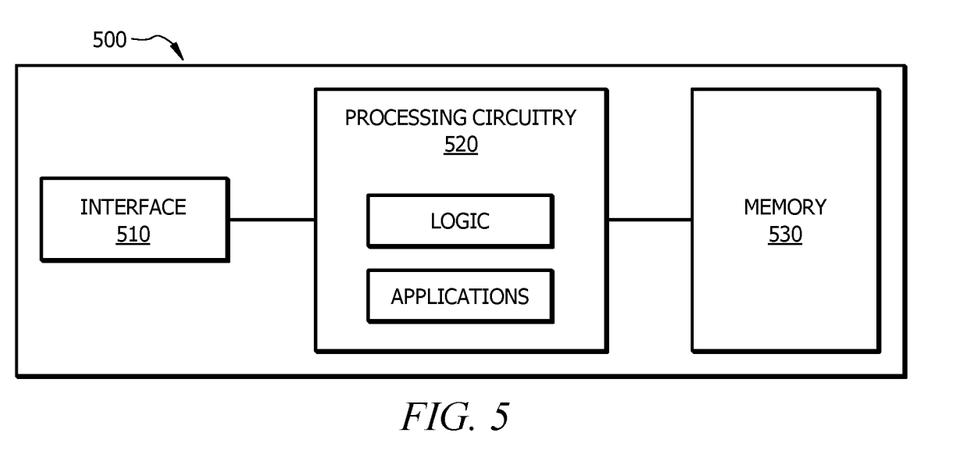
FIG. 5 illustrates an example computer system that may be used by the systems and methods described herein.

FIGS. 1 through 5 show example systems and methods for building an optimization application. FIG. 1 shows an example system for building an optimization application and FIG. 2 shows an example optimization application builder that may be used by the system of FIG. 1. FIG. 3 shows an example method for implementing an optimization application and FIG. 4 shows an example method for building an optimization application that may be used by the system of FIG. 1. FIG. 5 shows an example computer system that may be used by the systems and methods described herein.

FIG. 1 illustrates an example system 100 for building an optimization application. System 100 of FIG. 1 includes a network 110, an optimization application builder 120, an application developer module 140, a policy system 150, a data inventory system 160, and a client module 170. Optimization application builder 120 includes builder database 200, application developer module 140 includes developer database 146, policy system 150 includes policy database 152, and data inventory system 160 includes inventory database 164. System 100 or portions thereof may be associated with an entity, which may include any entity, such as a business or company, that builds or implements optimization applications. The elements of system 100 may be implemented using any suitable combination of hardware, firmware, and software.

Network 110 may be any type of network that facilitates communication between components of system 100. Network 110 may connect optimization application builder 120, application developer module 140, policy system 150, data inventory system 160, and client module 170 of system 100. Although this disclosure shows network 110 as being a particular kind of network, this disclosure contemplates any suitable network. One or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, optimization application builder 120 may communicate over network 110, including receiving information from application developer module 140, policy system 150, data inventory system 160, and client module 170 and transmitting information to application developer module 140, policy system 150, data inventory system 160, and client module 170.

Optimization application builder 120 is a computer system that builds and implements optimization applications. Optimization application builder 120 may receive a request for an optimization from client module 170, interact with other components of system 100 to determine a solution for the optimization, and send the solution to client module 170.

Optimization application builder 120 includes builder database 200, and builder database 200 includes optimization applications 210, management applications 220, optimization builder applications 230, and optimization solvers 250. Optimization applications 210 are applications that may convert policies into optimization constraints and objective functions and conduct optimization using optimization solvers 250. Management applications 220 are runtime, framework management modules that operate once optimization application 210 is in operation. Management applications 220 may generate a layout of optimization application 210, provide application stability, and facilitate development, packaging, and deployment related operations of optimization application 210, and configure the resiliency, scalability, packaging, and deployment functionalities of optimization application. Optimization builder applications 230 represent a library of development modules that may be used to build optimization application 210. Depending on the requirements for a particular optimization application 210, application developer module 140 may select certain optimization builder applications 230 to build optimization application 210. Optimization solvers 250 represent a library of optimizers, such as generic and custom solvers, that may be used by optimization application 210. Optimization applications 210, management applications 220, optimization builder applications 230, and optimization solvers 250 are described in more detail in FIG. 2 below.

Application developer module 140 is a computer system that develops optimization applications 210. Application developer module 140 designs optimization applications 210 using an optimization framework provided by optimization application builder 120. For example, application developer module 140 may design optimization applications 210 using optimization builder applications 230 and optimization solvers 250 of builder database 200. Application developer module 140 receives an auto-populated framework configuration file from optimization application builder 120 and configures the framework configuration file. Application developer module 140 may provide input to optimization application 210 of optimization application builder 120 using a DSL defined by the framework configuration file. Application developer module 140 includes application developer workstation 142, application developer 144, and developer database 146.

Application developer workstation 142 of application developer module 140 may be any computing device that provides a mechanism to view and interact with information received from one or more components (e.g., optimization application builder 120) of system 100. Application developer workstation 142 may include a graphical user interface (GUI) that can display information. Application developer workstation 142 may be located on the physical premises of the entity associated with system 100 (e.g., one or more buildings at one or more geographical locations of the entity). In some embodiments, application developer workstation 142 is located outside of the physical premises of the entity associated with system 100 (e.g., at a residence of application developer 144), wherein application developer 144 of application developer workstation 142 connects to network 110 of the entity associated with system 100 via a virtual private network (VPN).

Application developer 144 may be any administrator of the entity associated with system 100 (e.g., a system administrator, a database administrator, or an application owner) involved with building or implementing optimization application 210. For example, application developer 144 may be responsible for providing application inputs into application developer workstation 142. Application developer 144 may use application developer workstation 142 to connect to optimization application builder 120 over network 110. In certain embodiments, application developer 144 of application developer workstation 142 is authorized by the entity associated with system 100 to access optimization application builder 120. In certain embodiments, application developer 144 may be requested to enter an identification associated with the entity associated with system 100 to access optimization application builder 120 via a web portal.

Developer database 146 of application developer module 140 stores application inputs 148. Application inputs 148 are used by optimization application builder 120 to build optimization applications 210. Application inputs 148 include information such as application configurations, data templates, and optimization models that are input into optimization application 210 of optimization application builder 120. Application developer 144 may transmit application inputs 148 to optimization application builder 120 via application developer workstation 142. Application inputs 148 are described in more detail in FIG. 2 below.

Policy system 150 is a computer system that generates policy templates using information (e.g., policy models) received from optimization application builder 120. Policy system 150 uses the policy templates to create policies 154. Policy database 152 is a component that stores polices 154 for system 100. Policies 154 define the goals of an optimization application 210. For example, policy 154 may specify a maximum distance from a customer that a server may be placed, and optimization application 210 may generate a solution for the placement of a server based on policy 154. As another example, policy 154 may specify that certain equipment may not be placed in certain rooms. As still another example, policy 154 may specify that certain functions cannot be performed by a same computer system or data center. As still another example, policy 154 may restrict schedule changes (e.g., flight changes) for a change scheduling optimization application to weekdays. Policies 154 may be internal or external to an entity associated with optimization application builder 120. Policy system 150 may include one or more components of the computer system of FIG. 5.

Data inventory system 160 is a computer system that stores data that may be used by system 100. Inventory database 162 is a component that stores data 164 for system 100. Data 164 includes data that may be used by optimization application 210. For example, data 164 may provide the locations where a server may be placed, and optimization application 210 may generate a solution for the placement of a server based on data 164. As another example, data 164 include topological information of where certain systems are located. As still another example, data 164 may include an existing schedule of changes (e.g., flight changes) that have already been planned. Data inventory system 160 may include one or more components of the computer system of FIG. 5.

Developer database 146, policy database 152, inventory database 162, and builder database 200 are any components that can store data associated with system 100. Developer database 146, policy database 152, inventory database 162, and builder database 200 may each store certain types of information for network 110. Developer database 146, policy database 152, inventory database 162, and builder database 200 may each be a single database or may include multiple databases.

Developer database 146, policy database 152, inventory database 162, and builder database 200 may each include any one or a combination of volatile or non-volatile local or remote devices suitable for storing information. Developer database 146, policy database 152, inventory database 162, and builder database 200 may each include random-access memory (RAM), read-only memory (ROM), magnetic storage devices, optical storage devices, or any other suitable information storage device or a combination of these devices. Although developer database 146, policy database 152, inventory database 162, and builder database 200 are shown separate from each other in FIG. 1, developer database 146, policy database 152, inventory database 162, and builder database 200 may be located in any location suitable for communication with other components of system 100. Developer database 146, policy database 152, inventory database 162, and/or builder database 200 may be externally located from system 100. Developer database 146, policy database 152, data inventory database 162, and builder database 200 may be a single database. Although described as a database, developer database 146, policy database 152, inventory database 162, and builder database 200 may each be implemented as any suitable type of volatile or non-volatile memory. Developer database 146, policy database 152, inventory database 162, and builder database 200 may each include one or more interfaces and/or processors.

Client module 170 is a computer system that provides optimization requests to optimization application builder 120. Client module 170 includes client 174 and client workstation 176. Client 174 may be any person, organization, or software program that utilizes optimization application 210. For example, client 174 may be a customer of an entity associated with optimization application builder 120. As another example, client 174 may be an administrator of an entity associated with optimization application builder 120. Client 174 may be responsible for requesting optimizations from optimization application builder 120. Client 174 may use client workstation 176 to connect to optimization application builder 120 over network 110. Client 174 may require authorization by the entity associated with system 100 to access optimization application builder 120.

Client workstation 176 of system 100 may be any computing device that provides a mechanism to view and interact with information received from one or more components (e.g., optimization application builder 120) of system 100. Client workstation 176 may include a GUI that can display information. Client workstation 176 may be located on the physical premises of the entity associated with system 100 (e.g., one or more buildings at one or more geographical locations of the entity). Client workstation 176 may be located outside of the physical premises of the entity associated with system 100 (e.g., at a customer location).

Although FIG. 1 illustrates a particular arrangement of network 110, optimization application builder 120, application developer module 140, policy system 150, data inventory system 160, and client module 170, this disclosure contemplates any suitable arrangement of network 110, optimization application builder 120, application developer module 140, policy database 152, inventory database 162, and client module 170. Two or more of network 110, optimization application builder 120, application developer module 140, policy system 150, data inventory system 160, and client module 170 may be connected to each other directly, bypassing network 110. Two or more of network 110, optimization application builder 120, application developer module 140, policy system 150, data inventory system 160, and client module 170 may be physically or logically co-located with each other in whole or in part. Although FIG. 1 illustrates a particular number of networks 110, optimization application builders 120, application developer modules 140, policy systems 150, data inventory systems 160, and client modules 170, this disclosure contemplates any suitable number of networks 110, optimization application builders 120, application developer modules 140, policy systems 150, data inventory systems 160, and client modules 170.

In operation, optimization application builder 120 receives (see notation 180) a request for optimization from client module 170 via network 110. Optimization application builder 120 receives (see notation 182) application inputs 148 from application developer module 140, receives (see notation 184) policies 154 from policy system 150, and receives (see notation 186) data 164 from data inventory system 160. Optimization application builder 120 builds optimization application 210 using one or more optimization builder applications 230 (e.g., a policy to constraint translator). For example, using the one or more optimization builder applications 230, optimization application builder 120 may convert policies 154 to optimization constraints and objective functions. Optimization application builder 120 determines a solution to the optimization and transmits (see notation 188) the solution to client module 170.

As such, system 100 of FIG. 1 builds and implements an optimization application using a framework that can be reused and exposed as a service to multiple systems, which eliminates the need to replicate common functionalities and reduces the time required to market the optimization application.

FIG. 2 illustrates an example optimization application builder 120 that may be used by the system of FIG. 1. Optimization application builder 120 includes an interface 122, a memory 124, a processor 126, and builder database 200.

Interface 122 of optimization application builder 120 represents any suitable computer element that can receive information from network 110, transmit information through network 110, perform suitable processing of the information, communicate to other components (e.g., application developer module 140) of system 100, or any combination of the preceding. Interface 122 may receive application inputs 148 from application developer module 140, policies 154 from policy database 152, and data 164 from inventory database 162 via network 110 of FIG. 1, for example. Interface 122 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 124 of optimization application builder 120 stores, permanently and/or temporarily, received and transmitted information, as well as system software, control software, other software for optimization application builder 120, and a variety of other information. Memory 124 may store information for execution by processor 126. Memory 124 may store builder database 200. Memory 124 includes any one or a combination of volatile or non-volatile local or remote devices suitable for storing information. Memory 124 may include RAM, ROM, magnetic storage devices, optical storage devices, or any other suitable information storage device or a combination of these devices. Memory 124 may include any suitable information for use in the operation of media recommendation generator 120. Additionally, memory 124 may be a component external to (or may be partially external to) optimization application builder 120. Memory 124 may be located at any location suitable for memory 124 to communicate with optimization application builder 120.

Processor 126 of optimization application builder 120 controls certain operations of optimization application builder 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to optimization application builder 120. Processor 126 may be located in any location suitable for processor 126 to communicate with optimization application builder 120. Processor 126 controls the operation of optimization applications 210, management applications 220, optimization builder applications 230, and optimization solvers 250 of builder database 200.

Optimization applications 210 of builder database 200 are computer programs that generate solutions based on policies 154 and data 164. Optimization applications 210 may include a homing application 212, a capacity planning application 214, and a change scheduling application 216. Homing application 212 is an application for selecting a location of an object. For example, homing application 212 may determine an optimal location for a server. Capacity planning application 214 is an application for determining production capacity required by an entity to meet demands. For example, capacity planning application 214 may estimate a requirement for storage resources over a period of time. Change scheduling application 216 is an application for determining a schedule change. For example, change scheduling application 216 may determine an updated flight schedule for an airline company.

Management applications 220 of builder database 200 are computer programs that manage optimization applications 210. Management applications 220 are run-time components that function once optimization application 220 is in operation. Management applications 220 include a project structure and interface generator 222, scalability and resiliency applications 224, dependency management, packaging, and deployment applications 226, and a framework configurator 228.

Project structure and interface generator 222 generates a layout of optimization application 210 using pre-designed application templates. Project structure and interface generator 222 may bring up an interface to allow client module 170 to communicate with optimization applications 210.

Scalability and resiliency applications 224 provide stability to optimization applications 210. Scalability and resiliency applications 224 may provide scalability to optimization applications 210, which allows optimization applications 210 to handle peaks and dips in network traffic automatically. Scalability and resiliency applications 224 may provide resiliency to optimization applications 210, which allows optimization applications 210 to continue to function despite expected or unexpected failures of components of optimization applications 210. Upon a project creation, the framework of optimization application builder 120 incorporates scalability and resiliency applications 224 to provide stability.

Dependency management, packaging, and deployment applications 226 facilitate application development, packaging, and deployment related operations for optimization applications 210. Upon creation of optimization application 210, dependency management, packaging, and deployment applications 226 auto-populate a framework configuration file. The framework configuration file may provide credentials to interface with other systems (e.g., application developer module 140, policy database 152, and inventory database 162), a query structure to read and/or write information to the other systems, and configurations for resiliency, scalability, packaging, deployment, and dependency management. Based on the configuration values, framework configurator 228 configures the resiliency, scalability, packaging, and deployment functionalities for optimization applications 210. Application developer 144 of FIG. 1 configures the framework configuration file.

Application developer 144 of FIG. 1 configures the framework configuration file by providing application inputs 148 to optimization application builder 120 via application developer workstation 142. Application inputs 148 include application configuration files 260, optimization models 262, and data templates 264. Application configuration files 260 contain information related to the source of data 164 from data inventories 162, source data format and source data units, the query information for retrieving data 164, the target data format and the target data units, and the execution flow related information. The framework configuration file provides a DSL to specify application configuration file 260. Optimization models 262 include models of constraints and objective functions required by optimization application 210. The framework configuration file provides a DSL to model the constraints and objective functions. Data templates 264 include information required for optimization solvers 250 and how this information should be structured. The framework configuration file provides a DSL to specify data template 264.

Optimization builder applications 230 of optimization application builder 120 are a library of computer programs that may be used to build standalone optimization applications 210 from one or more optimization solvers 250. Application developer 144 of FIG. 1 may select certain optimization builder applications 230 to use with optimization solver 250 to build optimization application 210. Optimization builder applications 230 include an interface model generator 232, a policy model generator 234, interface validation applications 236, a policy model uploader 238, an application orchestrator 240, policy and data adaptors 242, policy to constraint translators 244, data normalization and formatting applications 246, and a data file generator 248.

Interface model generator 232 auto-generates interface validation models using validation requirements defined in application configuration file 260. Policy model generator 234 auto-generates policy models from policy specification requirements defined in application configuration file 260. The auto-generated validation models are fed to interface validation application 236 to validate an optimization request to optimization application 210. The auto-generated policy models are uploaded to policy system 150 of FIG. 1 using policy model uploader 238.

Application orchestrator 240 is a configuration-driven controller that manages the execution flow within optimization application 210. Application orchestrator 240 may include a set of standard execution flows that may be configured by application configuration file 260. Application orchestrator 240 talks to policy system 150 and data inventory system 160 of FIG. 1 using policy and data adaptors 242 to retrieve policies 154 from policy database 152 and data 164 from inventory database 162 that are relevant to optimization application 210. Policy and data adaptors 242 may allow optimization application builder 120 to retrieve information from other systems without concern for credential management and underlying technologies used to set up connections and query the other systems. Optimization application builder 120 provides credentials and data query formats to communicate with the other systems.

Application orchestrator 240 sends policies 154 received from policy system 150 of FIG. 1 to policy to constraint translators 244, which translate policies 154 to constraints and return the equivalent translated constraints back to application orchestrator 240. Application orchestrator 240 sends data 164 received from inventory database 162 of data inventory system 160 to data normalization and formatting applications 246. Data normalization and formatting applications 246 transform data between different formats and units. For example, data normalization and formatting applications 246 may normalize data 164 into one or more sets of standard units, transform the normalized data into target formats as defined in application configuration file 260, and return the normalized and formatted data back to application orchestrator 240.

Application orchestrator 240 sends the optimization request, the translated constraints, and the normalized and formatted data to data file generator 248. Data file generator 248 auto-generates a data file by combining data received from various systems with data template 264.

Optimization solvers 250 are optimizers offered by builder database 200 to build optimization applications 210. Optimization solvers 250 may be used as building blocks to build optimization applications 210. Optimization solvers 250 may be any suitable type. Optimization solvers 250 include generic solvers 252 and custom solvers 254. Application configuration file 260 includes information specifying which optimization solver 250 to use for optimization application 210. The framework configuration file includes instructions on how to utilize optimization solver 250. Using the information from application configuration file 260 and the framework configuration file, application orchestrator 240 sends the generated data file and optimization model 262 to optimization solver 250. Since the data file and optimization models 262 are generated in common standard formats using the DSLs specified by the framework configuration file of optimization application builder 120, the data file and optimization models 262 need to be converted into proprietary formats accepted by optimization solver 250. The framework of optimization application builder 120 provides translators for optimization models 262 and the data files for each optimization solver 250. Optimization solver 250 returns a solution to application orchestrator 240 and a state manager. The state manager is an application that manages the state of one or more user interface controls. The state manager transforms the data into queries using the framework configurations and sends the queries to data adaptors 242 to update data inventory system 160.

FIGS. 3A, 3B, and 3C show an example method 300 for implementing an optimization application that may be used by system 100 of FIG. 1. Method 300 starts at step 305. At step 310, where interface model generator 232 reads application configuration file 260 and generates an interface validation model. At step 312, the generated interface validation model is consumed by interface validation application 236 to validate a request from client 174. At step 314, policy model generator 234 generates policy models using the information provided in application configuration file 260. At step 316, the policy models are sent to policy model uploader 238. At step 318, policy model uploader 238 uploads the policy models into policy system 150. Policy system 150 generates policy templates using the policy models, which are used to create optimization policies 154. At step 320, client 174 submits an optimization request for optimization application 210, which is received by interface validation application 236. At step 322, interface validation application 236 validates the data of the optimization request against the interface validation model generated by interface model generator 232. Once a valid request is identified, the request is forwarded to application orchestrator 240.

At step 324, application orchestrator 240 reads application configuration file 260 to configure the orchestration flow of optimization application 210. Application configuration file 260 may capture the information related to which systems should be called, the sequence each system should be called, and policies 154 for which to pull the information required for the requested optimization.

Depending on the orchestration flow defined in application configuration file 260, method 300 may implement the following steps 326 through 354 in different orders. Method 300 may repeat one or more of the following steps 336 through 348 in the event information is to be retrieved from more than one system.

At step 326, application orchestrator 240 communicates with policy adaptor 242 and sends the information (e.g., an optimization request or data 164) obtained from various sources (e.g., client 174 or data inventory system 160) to build a query for policy system 150. At step 328, policy adaptor 242 communicates with policy system 150 using the query built in step 326. At step 330, policy system 150 returns policies 154 relevant to the query back to application orchestrator 240. At step 332, application orchestrator 240 sends received policies 154 to policy to constraint translator 244. At step 334, policy to constraint translator 244 converts policies 154 into equivalent constraints and returns the constraints to application orchestrator 240.

At step 336, application orchestrator 240 communicates with one or more data adaptors 242 to retrieve data 164 from data inventory system 160. The communications to data adaptors 242 may be sequential, parallel, or a combination thereof as defined by the orchestration flow in application configuration file 260. At step 338, framework configurator 228 provides interface configurations and query structure for data 164 of data inventory system 160 to data adaptors 242. At step 340, data 164 from data inventory system 160 is retrieved by data adaptors 242. At step 342, data adaptors 242 return retrieved data 164 back to application orchestrator 240.

At step 344, application orchestrator 240 sends received data 164 to data normalization and formatting application 246. At step 346, data normalization and formatting application 246 reads data normalization and formatting requirements from application configuration file 260. Data normalization and formatting application 246 normalizes the input data into target units and changes the structure of the data as defined in application configuration file 260. At step 348, the processed data is sent back to application orchestrator 240.

At step 349, application orchestrator 240 determines whether to retrieve information from an additional data inventory system 160. If application orchestrator 240 determines to retrieve information from an additional data inventory system 160, method 300 moves to step 336 and repeats steps 336 through 348. If application orchestrator 240 determines not to retrieve information from an additional data inventory system 160, method 300 moves to step 350.

At step 350, application orchestrator 240 sends the optimization request, the translated constraints, and the processed data to data file generator 248. At step 352, data file generator 248 uses one or more data templates 264 and the information received from application orchestrator 240 to generate a data model. At step 354, the data model is sent back to application orchestrator 240. At step 356, application orchestrator 240 sends the data model to optimization solver 250. At step 358, optimization solver 250 reads optimization model 262. Optimization model 262 may be received from application developer module 140. At step 360, optimization solver 250 uses the combination of optimization model 262 and data models to determine a solution that is sent to application orchestrator 240.

At step 362, application orchestrator 240 sends the determined solution to data normalization and formatting application 246. At step 364, data normalization and formatting application 246 reads the data format and data unit information of data inventory system 160 and a client response from application configuration file 260. At step 366, data normalization and formatting application 246 transforms the solution information into the format and units from step 264 and sends the transformed solution information back to application orchestrator 240 in formats that are compliant to the expected client response and data inventory schema.

At step 368, application orchestrator 240 sends the solution information to data adaptor 242. At step 370, framework configurator 228 provides interface configurations and query structure for data inventory system 160 to data adaptors 242. At step 372, data adaptors 242 write the solution information to data inventory system 160. At step 374, application orchestrator 240 sends the solution information to client 174 as a response. Method 300 ends at step 378.

Modifications, additions, or omissions may be made to method 300 depicted in FIGS. 3A-3C. Method 300 may include more, fewer, or other steps. Steps may also be performed in parallel or in any suitable order. While discussed as specific components completing the steps of method 300, any suitable component of system 100 may perform any step of method 300.

FIG. 4 shows an example method 400 for building an optimization application that may be used by system 100 of FIG. 1. Method 400 begins at step 405. At step 410, optimization application builder 120 determines what type of optimization solver 250 will be used by optimization application 210. For example, optimization application builder 120 may determine whether optimization application 210 will use generic solver 252 or custom solver 254.

If optimization application builder 120 determines that optimization application 210 will use generic solver 252, method 400 proceeds to step 420. At step 420, optimization application builder 120 models the constraints and objectives of an optimization service using the DSL specified by the framework configuration file and captures the models into optimization model 262. Method 400 then proceeds to step 430, where data template 264 is constructed to capture data 164 to support optimization model 262 using the DSL of the framework. Method 400 then proceeds to step 460.

If optimization application builder 120 determines that optimization application 210 will use custom solver 254, method 400 proceeds from step 410 to step 440. At step 440, a package for custom solver 254 is included in the library of optimization solvers 250. Method 400 then proceeds to step 450, where data template 264 is constructed to capture the interface of custom solver 254 using the DSL specified by the framework configuration file. Method 400 then proceeds to step 460.

At step 460, application configuration file 260 is built using the DSL specified by the framework configuration file to capture the information related to the policy models, application interface, solver interface, and execution flow. The information may include the source of data 164, the source data type, the format and potential units, mandatory and/or optional meta information for the data attribute, the query information for retrieving data 164, and the target data type, format, and/or units. At step 470, a project is created to build optimization application 210. Optimization model 262, data template 264, and application configuration file 260 may be stored in appropriate directories such that they can be utilized to build optimization application 210. At step 480, the resiliency, scalability, packaging, and deployment requirements are configured into the framework configuration file. At step 490, optimization application 210 is deployed. Optimization application 210 may be compiled, packaged, and deployed using framework configurator 228.

Modifications, additions, or omissions may be made to method 400 depicted in FIG. 4. Method 400 may include more, fewer, or other steps. Steps may also be performed in parallel or in any suitable order. While discussed as specific components completing the steps of method 300, any suitable component of system 100 may perform any step of method 400.

FIG. 5 shows an example computer system that may be used by the systems and methods described herein. For example, any of network 110, optimization application builder 120, application developer module 140, policy system 150, data inventory system 160, and client module 170 of FIG. 1 may include one or more interface(s) 510, processing circuitry 520, memory(ies) 530, and/or other suitable element(s). The computer system of FIG. 5 may have artificial intelligence (AI) and/or machine learning (ML) capabilities.

Interface 510 (e.g., interface 122 of FIG. 2) receives input, sends output, processes the input and/or output, and/or performs other suitable operation. Interface 510 may comprise hardware and/or software.

Processing circuitry 520 (e.g., processor 126 of FIG. 2) performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 (e.g., memory 124 of FIG. 2) may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductorbased or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving, by one or more interfaces:
      an application configuration file that is built using a Domain Specific Language (DSL) specified by a framework configuration file;
      an optimization application, wherein the application configuration file is used to configure an orchestration flow of the optimization application;
      a request for an optimization;
      one or more policies required to implement the optimization; and
      data required to implement the optimization;
   automatically generating, by one or more processors, an interface validation model using validation requirements defined in the application configuration file;
   validating, by the one or more processors, the request for the optimization using the interface validation model;
   converting, by the one or more processors and the optimization application, the one or more policies into optimization constraints and objective functions; and
   determining, by the one or more processors and the optimization application, a solution to the optimization based on the optimization constraints, the objective functions, and the data.

2. The method of claim 1, further comprising:
   receiving, by the interfaces:
      a request for a second optimization;
      one or more second policies required to implement the second optimization; and
      second data required to implement the second optimization;
   converting, by the one or more processors and the optimization application, the second policies into second optimization constraints and second objective functions; and
   determining, by the one or more processors and the optimization application, a second solution to the second optimization based on the second optimization constraints, the second objective functions, and the second data.

3. The method of claim 1, further comprising receiving, by the interfaces, a data template and an optimization model, wherein the optimization application utilizes the application configuration file, the data template, and the optimization model to determine the solution to the optimization.

4. The method of claim 1, further comprising developing, by the processors, the optimization application, wherein developing the optimization application comprises:
   determining whether the optimization application uses a generic solver;
   designing a data template;
   building the application configuration file;
   creating a project to build the optimization application using the data template and the application configuration file;
   configuring stability requirements into the application configuration file; and
   deploying the optimization application.

5. The method of claim 1, wherein the optimization application utilizes one or more following applications to determine the solution to the optimization:
   an interface model generator;
   a policy model generator;
   an interface validation application;
   a policy model uploader;
   an application orchestrator;
   a policy adaptor;
   a data adaptor;
   a policy to constraint translator;
   a data normalization and formatting application; and
   a data file generator.

6. The method of claim 1, wherein the policies and the data are received during run-time of the optimization application.

7. The method of claim 1, wherein the optimization application comprises one of a following:
   a homing application;
   a capacity planning application; and
   a change scheduling application.

8. One or more computer-readable non-transitory storage media embodying software that is executable to:
   receive an application configuration file that is built using a Domain Specific Language (DSL) specified by a framework configuration file;

receive an optimization application, wherein the application configuration file is used to configure an orchestration flow of the optimization application;

receive a request for an optimization;

receive one or more policies required to implement the optimization;

receive data required to implement the optimization;

automatically generate an interface validation model using validation requirements defined in the application configuration file;

validate the request for the optimization using the interface validation model;

convert, by the optimization application, the one or more policies into optimization constraints and objective functions; and determine, by the optimization application, a solution to the optimization based on the optimization constraints, the objective functions, and the data.

9. The media of claim 8, the software further executable to:

receive a request for a second optimization;

receive one or more second policies required to implement the second optimization;

receive second data required to implement the second optimization;

convert, by the optimization application, the second policies into second optimization constraints and second objective functions; and determine, by the optimization application, a second solution to the second optimization based on the second optimization constraints, the second objective functions, and the second data.

10. The media of claim 8, the software further executable to receive a data template and an optimization model, wherein the optimization application utilizes the application configuration file, the data template, and the optimization model to determine the solution to the optimization.

11. The media of claim 8, the software further executable to develop the optimization application, wherein developing the optimization application comprises:

determining whether the optimization application uses a generic solver;

designing a data template;

building the application configuration file;

creating a project to build the optimization application using the data template and the application configuration file;

configuring stability requirements into the application configuration file; and deploying the optimization application.

12. The media of claim 8, wherein the optimization application utilizes one or more following applications to determine the solution to the optimization:

an interface model generator;

a policy model generator;

an interface validation application;

a policy model uploader;

an application orchestrator;

a policy adaptor;

a data adaptor;

a policy to constraint translator;

a data normalization and formatting application; and a data file generator.

13. The media of claim 8, wherein the policies and the data are received during run-time of the optimization application.

14. The media of claim 8, wherein the optimization application comprises one of the following:

a homing application;

a capacity planning application; and a change scheduling application.

15. A system comprising one or more processors and a memory coupled to the processors comprising instructions executable by the processors to:

receive an application configuration file that is built using a Domain Specific Language (DSL) specified by a framework configuration file;

receive an optimization application, wherein the application configuration file is used to configure an orchestration flow of the optimization application;

receive a request for an optimization;

receive one or more policies required to implement the optimization;

receive data required to implement the optimization;

automatically generate an interface validation model using validation requirements defined in the application configuration file;

validate the request for the optimization using the interface validation model;

convert, by the optimization application, the one or more policies into optimization constraints and objective functions; and determine, by the optimization application, a solution to the optimization based on the optimization constraints, the objective functions, and the data.

16. The system of claim 15, the instructions further executable by the processors to:

receive a request for a second optimization;

receive one or more second policies required to implement the second optimization;

receive second data required to implement the second optimization;

convert, by the optimization application, the second policies into second optimization constraints and second objective functions; and determine, by the optimization application, a second solution to the second optimization based on the second optimization constraints, the second objective functions, and the second data.

17. The system of claim 15, the instructions further executable by the processors to receive a data template and an optimization model, wherein the optimization application utilizes the application configuration file, the data template, and the optimization model to determine the solution to the optimization.

18. The system of claim 15, the instructions further executable by the processors to develop the optimization application, wherein developing the optimization application comprises:

determining whether the optimization application uses a generic solver;

designing a data template;

building the application configuration file;

creating a project to build the optimization application using the data template and the application configuration file;

configuring stability requirements into the application configuration file; and deploying the optimization application.

19. The system of claim 15, wherein the optimization application utilizes one or more following applications to determine the solution to the optimization:
- an interface model generator;
- a policy model generator;
- an interface validation application;
- a policy model uploader;
- an application orchestrator;
- a policy adaptor;
- a data adaptor;
- a policy to constraint translator;
- a data normalization and formatting application; and
- a data file generator.

20. The system of claim 15, wherein the policies and the data are received during run-time of the optimization application.

\* \* \* \* \*